United States Patent
Batcher

(10) Patent No.: US 6,799,247 B1
(45) Date of Patent: Sep. 28, 2004

(54) REMOTE MEMORY PROCESSOR ARCHITECTURE

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 09/938,243

(22) Filed: Aug. 23, 2001

(51) Int. Cl.$^7$ .............................................. G06F 12/00
(52) U.S. Cl. ...................... 711/118; 711/121; 709/245; 710/305; 710/313; 710/314; 370/235
(58) Field of Search ................................ 711/121, 158, 711/118; 710/313, 314, 305, 307, 309; 709/245; 370/235

(56) References Cited

U.S. PATENT DOCUMENTS

| | | | |
|---|---|---|---|
| 5,130,922 A | * | 7/1992 | Liu ............................ 711/144 |
| 5,535,361 A | | 7/1996 | Hirata et al. ................ 711/145 |
| 5,802,577 A | * | 9/1998 | Bhat et al. ................... 711/146 |
| 5,895,487 A | | 4/1999 | Boyd et al. .................. 711/122 |
| 6,026,415 A | | 2/2000 | Garst et al. .................. 707/206 |
| 6,085,241 A | * | 7/2000 | Otis ............................ 709/223 |
| 6,119,147 A | | 9/2000 | Toomey et al. .............. 709/204 |
| 6,209,064 B1 | | 3/2001 | Weber ......................... 711/141 |
| 6,219,672 B1 | | 4/2001 | Hirayama et al. ........... 707/102 |
| 6,219,690 B1 | | 4/2001 | Slingwine et al. ........... 709/102 |
| 6,226,667 B1 | | 5/2001 | Matthews et al. ........... 709/203 |
| 6,356,942 B1 | | 3/2002 | Bengtsson et al. .......... 709/220 |
| 6,604,162 B1 | * | 8/2003 | Mosur et al. ................ 710/305 |
| 2001/0037406 A1 | * | 11/2001 | Philbrick et al. ............ 709/250 |
| 2003/0009334 A1 | | 1/2003 | Printz et al. ................. 704/256 |

OTHER PUBLICATIONS

Intel, Pentium Processor Specification, Jun. 1997, 241997–010, pp. 1–7.

* cited by examiner

Primary Examiner—Hong Kim
(74) Attorney, Agent, or Firm—Tucker Ellis & West LLP

(57) ABSTRACT

A remote memory processor architecture which provides an embedded processor with access to a large off-chip memory space via a HOST processor bus. An on-chip embedded memory provides a cache memory space.

29 Claims, 4 Drawing Sheets

REMOTE MEMORY PROCESSOR ARCHITECTURE

FIELD OF THE INVENTION

The present invention generally relates to a system for memory access, and more particularly to a remote memory processor architecture.

BACKGROUND OF THE INVENTION

In a typical wireless local area network (WLAN) configuration, a portable or mobile device (e.g., a laptop personal computer) normally includes a HOST processor and an associated communications module in the form of a PCI or PCMCIA card. Typically, a Medium Access Control (MAC) processing system, a PHY (physical layer) processing device (e.g., a digital signal processor), and a main memory reside on this card. This card typically takes the form of a printed circuit board (PC board) which connects all the components.

The MAC processing system includes a MAC processor (i.e., an embedded processor with associated off-chip memory and other custom logic located on a single integrated circuit). The MAC embedded processor is a multi-functional processor engine responsible for a variety of different processing tasks associated with the wireless communications. The PHY processing device performs such functions as encoding/decoding waveforms. Data is transferred between the MAC processing system and the HOST processor during data processing operations.

The trend toward low cost processors is often a driving force in the design of many embedded systems. Typically, custom Application-Specific Integrated Circuit (ASIC) devices are built around a central processor core (CPU), along with on-chip embedded memory (e.g., RAM, ROM and/or other auxiliary memory) and interface units to form a complete embedded processor. To achieve low cost for the overall bill of material for the entire PC board, silicon integration is used to combine what were previously separate integrated circuits on a PC board into a single integrated circuit. Such embedded processors often include an external memory interface which is used to access a memory space (e.g., off-chip memory located on the PC board) that is larger than that which can be placed on the single integrated circuit as on-chip memory or embedded memory. Due to the need for higher performance and increased software functionality, designers must rely on fast off-chip memories which can meet the low latency demands of high-speed embedded processors. Even with fast off-chip memories, the off-chip memory access speed requirements often constitute a bottleneck which compromises the overall speed of the embedded processor, which is often capable of speeds above 100 MHz or more, if it was not for the slow external memory interface.

It should be appreciated that the term "off-chip memory" is used herein to refer to memory that is on the same PC board, but not the same integrated circuit as the embedded processor. The term "remote external memory" refers to memory which is neither on the same PC board nor the same integrated circuit as the processor. The term "on-chip memory" or "embedded memory" is used herein to refer to memory which resides on the same integrated circuit as the ASIC embedded processor.

Furthermore, in small environments where PC board real-estate is a premium (such as mini-PCI and Cardbus form factors) off-chip memories take up valuable area of a card. Since RAMs require parallel address and data lines, as well as various control signals, they often pose a further challenge to board routing which adds to the overall system size. In portable environments, off-chip RAMs which are clocked at high speeds often consume a great deal of power. Also, the cost of off-chip RAM is expensive, often meeting or exceeding the cost of the ASIC embedded processor. Cost sensitivity in the consumer market is yet another reason making off-chip memories less attractive.

SUMMARY OF THE INVENTION

According to the present invention there is provided a remote memory processor architecture a remote memory processing system, comprising: a first processor including a CPU and a first memory, the CPU and the first memory located on a common integrated circuit; a second processor having an associated second memory; and a bus, wherein the first processor communicates with the second processor via said bus; wherein said first processor accesses the second memory, if it is determined that the first memory does not have the memory address that the first processor desires to access.

According to another aspect to the present invention there is provided a remote memory processor architecture a method of accessing data in a system comprised of a first processor including a CPU and a first memory, the CPU and the first memory located on a common integrated circuit; a second processor having an associated second memory; and a bus, wherein the first processor communicates with the second processor via said bus, said method including the steps of: accessing said first memory to access a selected memory address; determining whether the selected memory address is located in said first memory; and accessing said second memory if the selected memory address is not located in said first memory.

Yet another aspect to the present invention there is provided a remote memory processor architecture a remote memory processing system, comprising:

first processing means including a first memory means, the first memory means located on the same integrated circuit as a processing unit; second processing means having an associated second memory means; and connecting means for communicating data between said first processing means and said second processing means wherein said first processing means accesses the second memory means, if it is determined that the first memory means does not have the memory address that the first processing means desires to access.

An advantage of the present invention is the provision of a remote memory processor architecture which reduces the cost of a communications module.

Another advantage of the present invention is the provision of a remote memory processor architecture which reduces power consumption of a communications module.

Still another advantage of the present invention is the provision of a remote memory processor architecture which reduces the amount of PC board real-estate needed for a communications module.

Yet another advantage of the present invention is the provision of a remote memory processor architecture which provides a more efficient communications module.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

It should be appreciated that while the present invention is described herein in connection with a wireless communication system using a MAC processor, PHY processing device and a PCI or PCI-type (e.g., cardbus or mini-PCI) bus, it is contemplated that the present invention is suitably used in connection with other data processing environments, other data processing devices, and other bus designs. The wireless communication system illustrated herein is shown solely for the purpose of illustrating a preferred embodiment of the present invention, and not for limiting same.

Figure 1:
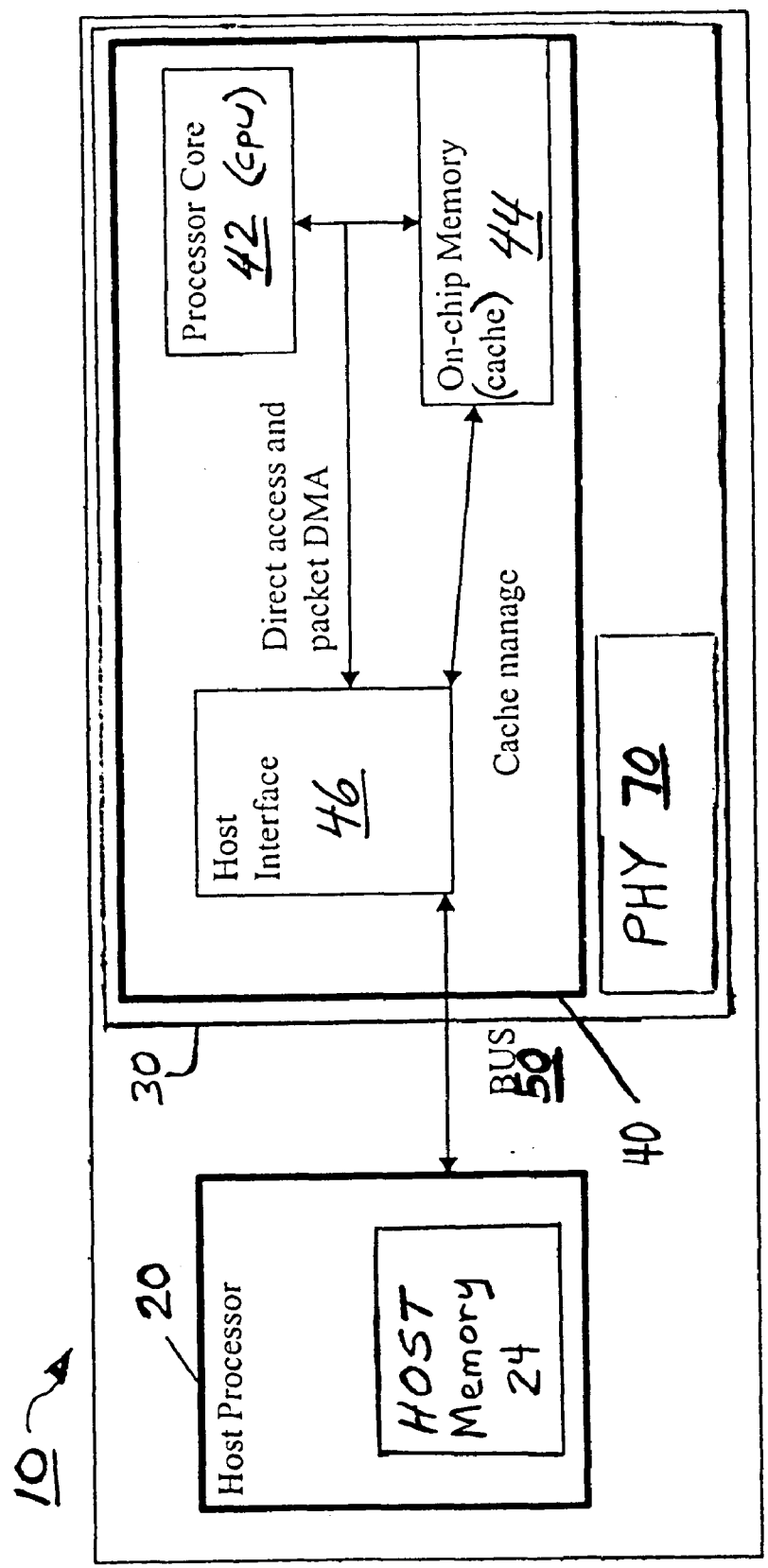
FIG. 1 is a block diagram of a communications system according to a preferred embodiment of the present invention.

Referring now to the drawings wherein the showings are for the purposes of illustrating a preferred embodiment of the invention only and not for purposes of limiting same, FIG. 1 illustrates a communications system 10, according to a preferred embodiment of the present invention. Communications system 10 is generally comprised of a host processor 20, a PHY processing device 70, and an embedded MAC processor 40. Embedded MAC processor 40 and PHY processing device 70 reside on a card 30 (e.g., a PCI card). A communications module is comprised of embedded MAC processor 40 and PHY processing device 70, along with other communication components (not shown) such as an antenna. A bus 50 is provided to transfer data between host processor 20 and embedded MAC processor 40. Host processor 20 has an associated global HOST memory 24.

Embedded processor 40 is generally comprised of a processor core (CPU) 42, an on-chip embedded memory (organized as a cache) 44 and a host interface 46.

It is recognized that many typical embedded systems use a Peripheral Component Interconnect (PCI) interface or an interface related to PCI, such as cardbus or mini-PCI. The PCI interface is a 64-bit bus, though it is usually implemented as a 32-bit bus. It can run at clock speeds of 33 or 66 MHz. At 32 bits and 33 MHz, it yields a raw throughput rate of 133 Mbytes per second. Use of such a flexible interface provides high speed and low latency which is optimal for the demands of embedded processors. Often such prior art systems use the PCI interface only as the main data pipe between the host processor and the embedded processor. Often this is done using DMA techniques with FIFO memories traditionally used to transfer packet data between the MAC and the HOST processor.

In accordance with a preferred embodiment of the present invention, a MAC processing system uses the PCI bus for the source of all memory for the embedded processor, including data read/writes and instruction fetch activity. Consequently, the embedded processor requires no external memory interface at all. As described further below, some memory accesses (i.e. memory read/write and instruction fetches) may be translated into on-chip memory (e.g. ROM or cache) 44 accesses, and therefore do not require external memory.

As indicated above, the present invention is described in connection with a PCI or PCI-type bus solely for the purpose of illustrating a preferred embodiment of the present invention, and not for limiting same. In this regard, other types of buses which allow for "bus mastering" (e.g., the embedded processor can take control of the bus) are also suitable for use with the present invention.

It should be understood that in accordance with a preferred embodiment of the present invention, a small amount of embedded memory (e.g., 8 KB to 16 KB) resides on-chip (i.e., on-chip memory 44). This embedded memory is arranged as a cache and may also include some ROM (and/or other auxiliary memory) which is used for holding the instructions used by the embedded CPU core 42. The ROM portion can also be used in conjunction with other functions, such as a MACRO execution function, as disclosed in related U.S. application Ser. No. 09/681,348.

The remaining memory space (which is significantly larger, e.g., several megabytes) resides remote from embedded processor 40, across HOST interface 46 on HOST processor 20. Any time data is needed by embedded processor 40, and it does not reside in on-chip memory 44 (i.e., a cache memory miss), embedded processor 40 obtains the needed data (via HOST interface 46) by addressing HOST memory 24 associated with HOST processor 20. HOST memory 24 provides memory for such items as program store (MAC processor instructions), local variable store, packet store along with HOST driver software. The Host driver software provides control routines loaded by the operating system which are responsible for communicating with card 30 across bus 50. Embedded processor 40 becomes bus master of bus 50 when accessing HOST memory 24.

It is recognized that use of a remote memory interface (e.g., host interface 46) can cause problems which negatively impact system performance. In this regard, long access times and the non-deterministic behavior of memory accesses can render the system useless in time-critical applications. It should be understood that the processing requirements of IEEE 802.11 wireless applications are very time critical and demand high performance from CPU core 42 similar to that experienced by real-time operating systems. CPU core 42 uses hardware based context switching in order to manage all tasks and respond in an efficient and timely manner.

The present invention provides methods which are used to efficiently map processor memory accesses into the HOST memory space, so that performance equal to or exceeding that of off-chip memory systems is provided. These methods are ideally suited for high performance context switching based applications suitable for wireless LAN systems.

Methods to efficiently map processor memory accesses into the HOST memory space are made possible using: (1) distributed memory hierarchy, (2) high speed interface, (3) wide bus architecture (i.e., the bus for data transfer between HOST processor 20 and MAC processor 40 is wider than the bus for data transfer between processor core 42 and on-chip memory 44), (4) burst style of data transfer, (5) context sensitive cache management and (6) shared memory. These features facilitate the embodiment of the present invention using a PCI or PCI-type bus for memory access. The present invention also provides several advantages for power savings as will be described in detail below.

With a distributed memory hierarchy CPU core 42 "sees" a single logical memory space of large size. All of this memory space is mapped across bus 50 and resides in HOST memory 24. However, some of this memory will reside internally, from time to time, on embedded processor 40 in the form of a cache in on-chip memory 44. Typically, on-chip cache memory controller 45 will manage the cache, and keep it current with the local instructions and data it is using. Accordingly, cache memory controller 45 enforces cache coherency and consistency between MAC and HOST memory systems. When an access occurs outside the cached region, embedded processor 40 will obtain the data from HOST processor 20 directly using bus 50, and then update the cache with this data.

Figure 2:
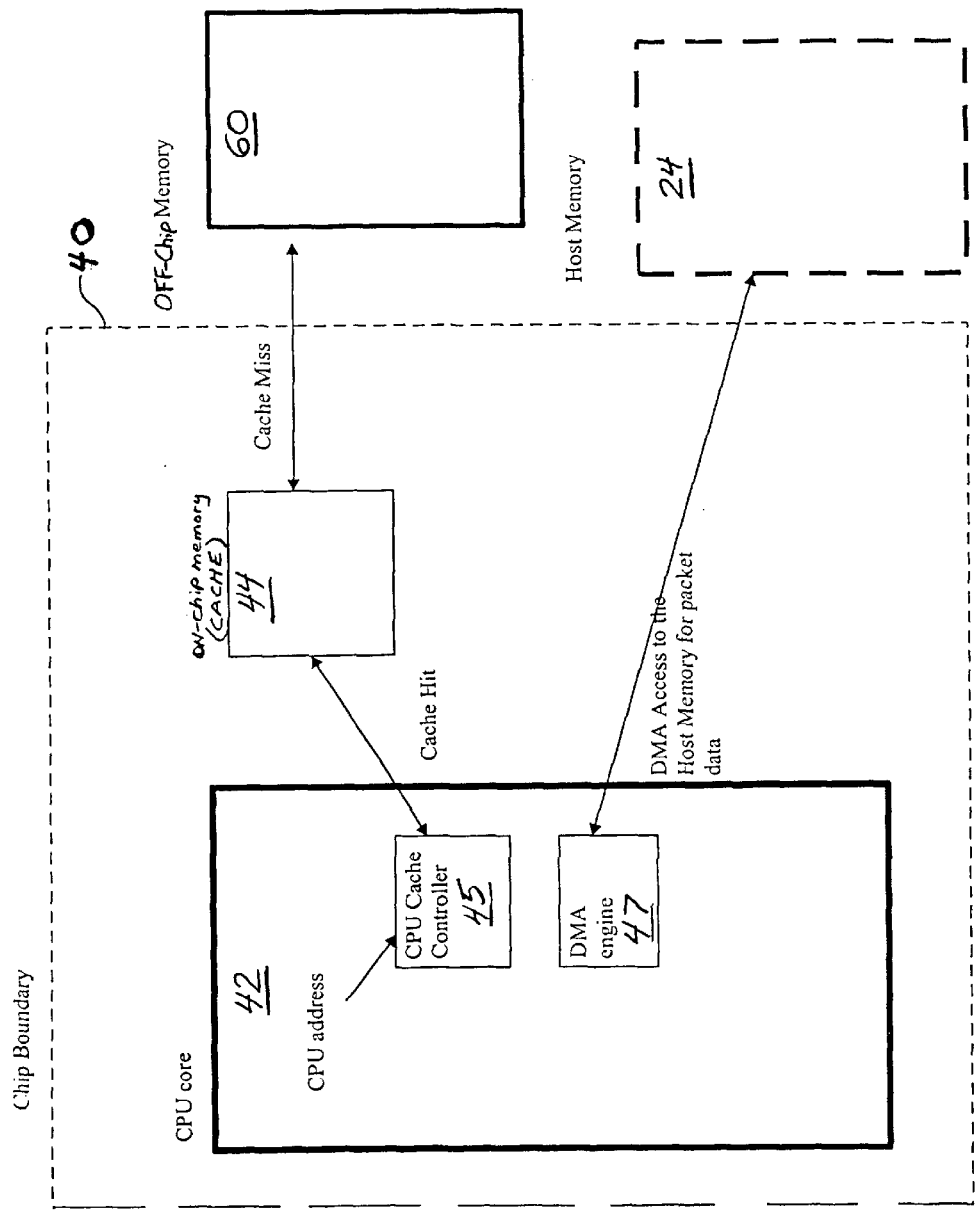
FIG. 2 illustrates the logical memory organization seen by an embedded processor with an off-chip memory, in accordance with the prior art.

The memory space "seen" by prior art systems is illustrated in FIG. 2. Cache memory 44 is "backed up" with an off-chip external memory 60, as opposed to a HOST memory. It should be noted that other on-chip memory which might be present with the cache (such as ROM) is not illustrated in FIG. 2. Thus, with the prior art, embedded processor 40 obtains data from an off-chip external memory, and updates the cache with this data. It should be understood that some bus interfaces (e.g., PCI) have support cache functions (e.g. write invalidate and read line).

Figure 3:
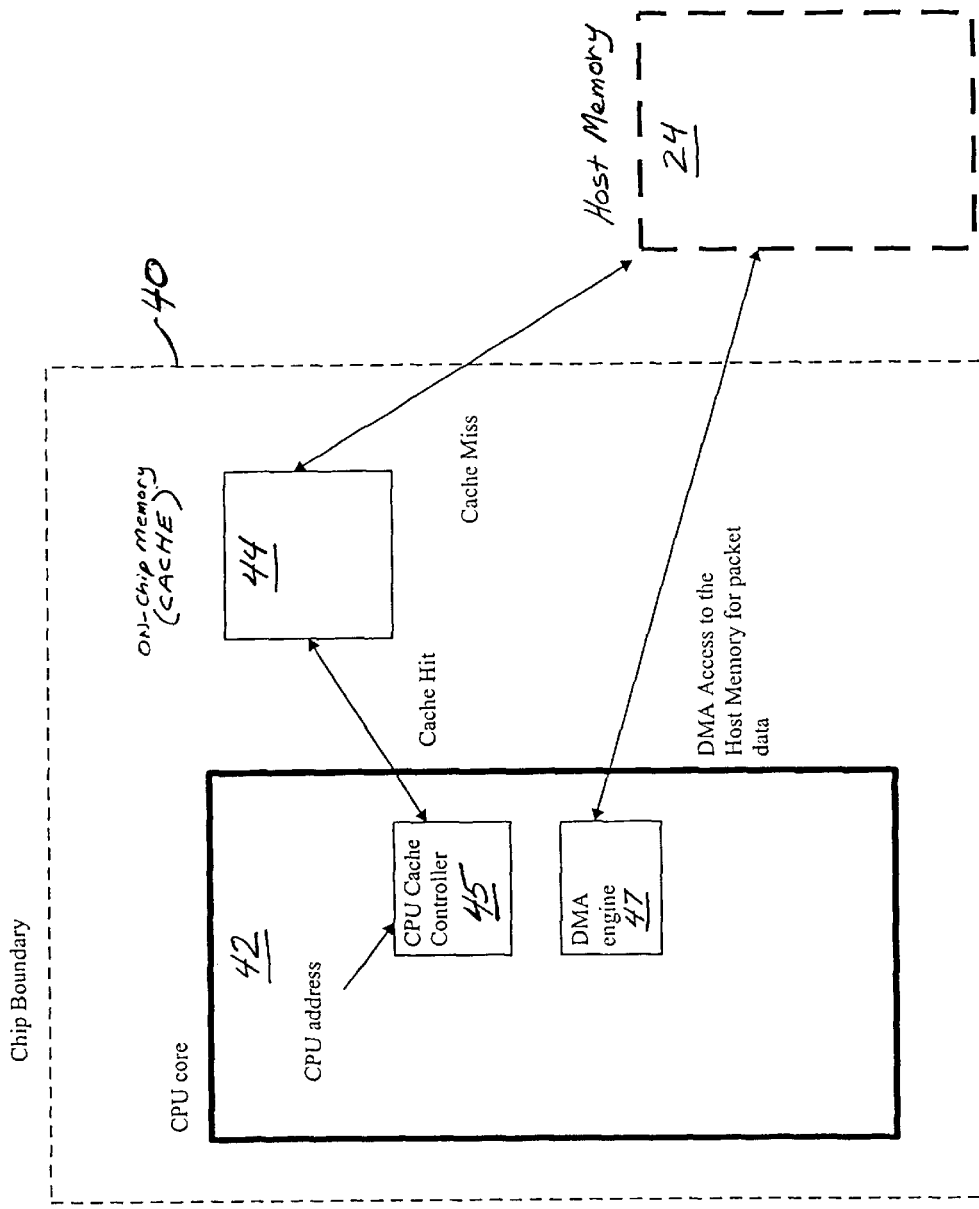
FIG. 3. Illustrates the logical memory organization seen by an embedded processor according to a preferred embodiment of the present invention.

A preferred embodiment of the present invention uses the architecture shown in FIG. 3. In this case, cache 44 is "backed up" using remote HOST memory 24. Therefore, all cache misses result in accesses to HOST memory 24. It should be appreciated that as long as cache controller 45 and HOST bus 50 can match the performance of the prior art, the MAC processing system will be equal to or exceed the performance of the prior art.

In the prior art (FIG. 2), HOST memory 24 is not directly addressable by the CPU core 42, since it is not part of the logical memory space. It is only accessible indirectly using techniques such as DMA (using DMA engine 47) to move packet data. In the case of the present invention, distributed memory is used, thus CPU core 42 can access HOST memory 24 in the same manner as it accesses an off-chip memory. Preferably, the DMA channel (DMA engine 47) is provided along with the remote memory access path. The fact that the memory physically resides on HOST processor 20 is hidden from CPU core 42. The latency for accessing HOST memory 24 is generally worse than the latency seen by external memory accesses, since HOST memory 24 is shared, and is addressed using a shared bus. The present invention compensates for this latency by using techniques discussed below.

Bus 50 provides a high speed interface which helps to alleviate the HOST memory latency. In this regard, current standards for a PCI bus include 33 Mhz or 66 Mhz with the new PCI-X standard, which is 133 Mhz. This high rate of speed is comparable to some traditional off-chip memories. CPU core 42 of embedded processor 40 runs at speeds lower than the bus, so the bus speed is suitable for embedded processors used in wireless LAN applications.

The PCI bus standard supports a wide bus architecture (i.e., 32-bit and 64-bit widths). By using a wide bus architecture on bus 50, embedded processor 40 can quickly exchange network data with HOST processor 20. Embedded processor 40 can also utilize the available bandwidth for transfer of processor code (instruction fetch) and memory read/write (R/W) operations. A typical MAC embedded processor uses a small bus width of 16-bits. Consequently, such an embedded processor can perform multiple read/write operations in a single bus transaction on a PCI bus.

A PCI bus is capable of reading or writing multiple sequential words in a single transaction (i.e., burst style of transfer). Therefore, a block of data can be quickly transferred between embedded processor 40 and HOST processor 20. Embedded processor 40 can utilize this feature to quickly update the cache blocks in embedded memory 44, and to perform read/write operations multiple times in a multiple wide bus transaction. It should be appreciated that memory on the HOST system is often cached for PCI bus accesses by the HOST processor. This enables fast burst transfers and better HOST latency since the data can be quickly returned to the bus master (CPU 42). As previously mentioned, the PCI bus protocol also has special support for reading cache lines, write invalidate operations, or read multiple cache lines which help with read accesses. These features help the cache controller 45 to maintain read and write cache consistency and coherency with the HOST memory 24, so that the cache data maintained on the MAC processor will be up-to-date.

It should be understood that a preferred embodiment of the present invention has been described for use in conjunction with a MAC processor that has built-in hardware-based context switching. The hardware-based context switching allows the operating state (e.g., idle or active) of the MAC processor to be detected by the hardware. The context switching is required in order to meet the high speed low latency demands of the IEEE 802.11 Wireless LAN protocol.

A particular process on CPU core 42 will run until it is context switched. This may happen when an event, such as the following, occurs: (a) a process exits, (b) a process uses up its time slice, (c) a process requires another resource that is not currently available or needs to wait for I/O to complete, (d) a resource has become available for a waiting process, (e) if there is a higher priority process ready to run, CPU core 42 will run the higher priority context instead, thus the current process is preempted, and (f) the process relinquishes the processor using a semaphore or similar system call.

Many different contexts may exist which have different priorities. The CPU core itself processes events and interrupts, and determines in a single cycle which context should be running. Hence, this avoids the necessity of a software kernel to make this determination, as done with conventional multi-tasking CPU engines. The CPU itself therefore causes a context switch to occur, thus moving to an appropriate execution software thread to handle the event. Since registers for the various contexts may be banked, a context switch is done quickly and efficiently with no operating system (OS) overhead to process the interrupt. A special instruction is used to suspend an execution thread, and return that context to waiting state until the next interrupt for that context occurs (similar to a blocking wait call with thread-based programming).

The CPU core itself, being aware of pending events and running contexts, can also determine in a single clock cycle if all contexts are idle (e.g., no actions are required and all context execution threads are in the waiting state). Hence, the current state of the CPU core (i.e., idle state and active state) can be detected rapidly and efficiently by the hardware in a single clock cycle without any overhead.

In general, cache designs also are not well suited for real time prioritized context switching applications. However, in accordance with a preferred embodiment of the present invention, a specialized caching method is used which is ideally suited for such context switching applications.

The distributed memory of the present invention is not only distributed, but shared. Embedded processor 40 and HOST processor 20 benefit from a single shared memory. In this regard, it is easy for processors 40 and 20 to communicate via message passing, since both write to the same common memory (i.e., HOST memory 24). Common data structures can be used to reduce the amount of memory storage to synchronize the HOST and MAC processors 40, 20. Provided the HOST and MAC processors 40, 20 are binary code compatible (e.g., have same instruction set). It is even possible for the HOST and MAC processors 40, 20 to share a common thread of executable code. This allows dynamic load sharing between tasks done by the HOST and MAC processors.

Furthermore, for message passing, bus architectures such as PCI are synchronous. Therefore, MAC and HOST processors can share a common clock for operations and hence no communication loss occurs with synchronizing data transfers between the MAC and HOST processors.

Figure 4A:
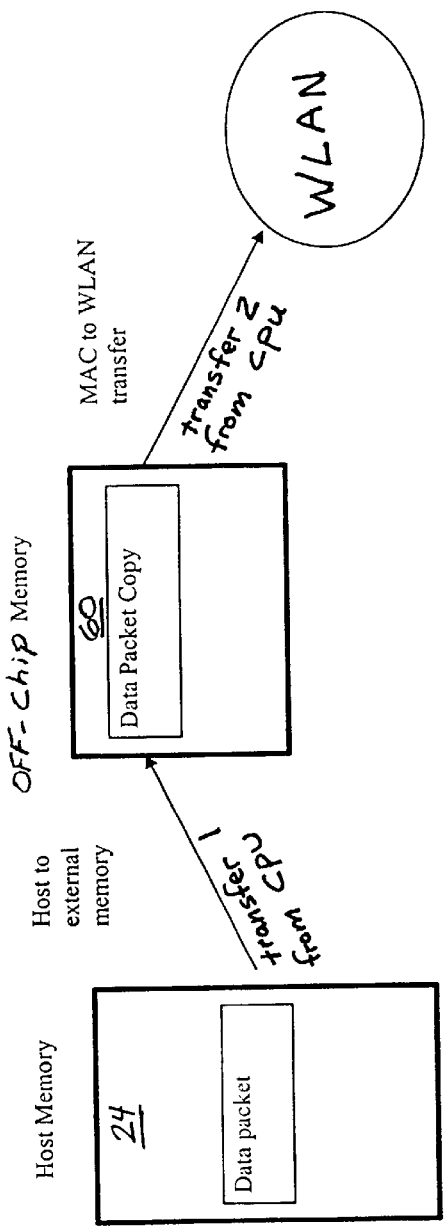
FIGS. 4a and 4b illustrate the advantages of the present invention with respect to distributed memory, as compared to the prior art.
Figure 4B:
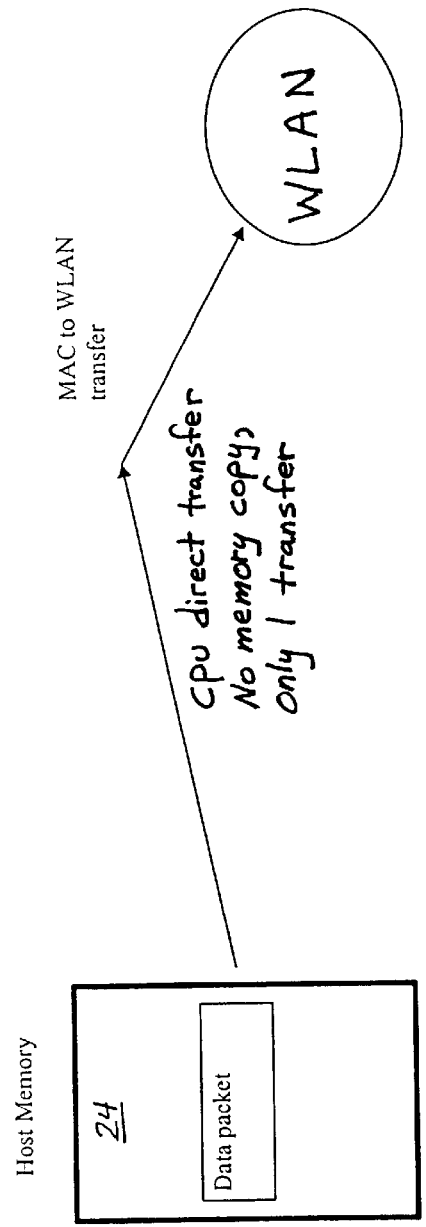

One advantage of distributed shared memory is the avoidance of data copies. For example, if a packet arrives to the HOST processor (for later transmittal to the MAC processor), the data will first be written to the MAC processor external memory. Later, the MAC processor will read that data from the external memory and send it via the IEEE 802.11 wireless LAN. As illustrated in FIG. 4a, in the prior art, this results in a two step process which is less efficient and requires two copies of the packet to be stored. FIG. 4b illustrates how a MAC processor can directly address the packet stored in HOST memory and transmit it across the wireless LAN, in accordance with a preferred embodiment of the present invention. For example, when transmitting a data packet from HOST driver software, across a wireless local area network (WLAN), the MAC processor can directly read it from the HOST and store it into data FIFO memories where it is later sent to the PHY. This is much more efficient than the two step process of having the HOST write the data to the MAC external memory, then having the MAC processor read that memory and store it into the FIFOs. It should be appreciated that in accordance with an alternative embodiment of the present invention, the concepts of the present invention may be applied to provide direct HOST to PHY accesses.

It is recognized that there are some challenges related to cache consistency, in order to keep embedded memory 44 current with HOST memory 24. However, once this issue addressed, an efficient communication channel between is opened between embedded processor 40 and HOST processor 20. This efficiency enables a system in accordance with the present invention to out perform a prior art system using external memory to back up a cache.

It is further recognized that having memory reside off-chip and off-card at HOST processor 20 saves the amount of power required on the card associated with the embedded processor. In this regard, the card no longer needs the power to read and write to an off-chip RAM. Efficient use of embedded memory (cache) 44 can also minimize power on bus 50, since no off-chip or off-card access is needed. Furthermore, when bus 50 is not needed, new mobile PCI bus and cardbus standards can use CLKRUN functionality to gate off the PCI bus clock, and greatly reduce power.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A remote memory processing system for a wireless communications systems, comprising:
   a PHY processor for encoding and decoding wireless signal waveforms;
   an embedded MAC processor including a CPU and an on-chip memory cache, the CPU and the on-chip memory cache located on a common integrated circuit;
   a host processor having an associated HOST memory; and
   a bus, wherein the embedded MAC processor communicates with the HOST processor via said bus;
   wherein said embedded MAC processor accesses the HOST memory, if it is determined that the on-chip memory cache does not have the memory address that the embedded MAC processor desires to access.

2. A remote memory processing system according to claim 1, wherein said embedded MAC processor and said cache memory reside on a card with said PHY processor.

3. A remote memory processing system according to claim 2, wherein said embedded MAC processor accesses said HOST memory in response to a cache miss.

4. A remote memory processing system according to claim 3, wherein said cache is updated with data read from said HOST memory.

5. A remote memory processing system according to claim 1, wherein said bus is at least one of a PCI bus and PCI-type bus.

6. A remote memory processing system according to claim 1, wherein said bus is wider than a bus associated with data transfer between the embedded MAC processor and the CPU and the on-chip memory cache.

7. A remote memory processing system according to claim 1, wherein said bus is a high speed bus capable of data transfer speeds of at least 33 MHz.

8. A remote memory processing system according to claim 1, wherein said on-chip memory cache includes a ROM.

9. A remote memory processing system according to claim 1, wherein said embedded MAC processor becomes master of said bus when accessing said HOST memory.

10. A remote memory processing system according to claim 1, wherein said bus is capable of reading or writing multiple sequential words in a single transaction.

11. A remote memory processing system according to claim 1, wherein said embedded MAC processor includes built-in hardware-based context switching.

12. A method of accessing data in a wireless communications systems comprised of a PHY processor for encoding and decoding wireless signal waveforms; an embedded MAC processor including a CPU and a memory cache, the CPU and the memory cache located on a common integrated circuit; a HOST processor having an associated HOST memory; and a bus, wherein the embedded MAC processor communicates with the HOST processor via said bus, said method including the steps of:
   accessing said memory cache to access a selected memory address;
   determining whether the selected memory address is located in said memory cache; and
   accessing said HOST memory if the selected memory address is not located in said memory cache.

13. A method according to claim 12, wherein said memory cache includes a cache memory associated is located on-chip with said embedded MAC processor.

14. A method according to claim 13, wherein said embedded MAC processor accesses said HOST memory in response to a cache miss.

15. A method according to claim 14, wherein said cache is updated with data read from said HOST memory.

16. A method according to claim 12, wherein said embedded MAC processor becomes master of said bus when accessing said HOST memory.

17. A method according to claim 12, wherein said bus reads and writes multiple sequential words in a single transaction.

18. A method according to claim 12, wherein said first processor includes built-in hardware-based context switching.

19. A remote memory processing system for wireless communications, comprising:
- a PHY processing means for encoding and decoding wireless signal waveforms;
- MAC processing means including a cache memory means, the cache memory means located on the same integrated circuit as a processing unit;
- HOST processing means having an associated HOST memory means; and
- connecting means for communicating data between said MAC processing means and said HOST processing means;
- wherein said MAC processing means accesses the memory means, if it is determined that he first memory means does not have the memory address that eh first processing means desires to access.

20. A remote memory processing system according to claim 19, wherein said MAC processing means and said cache memory means with reside on a card said PHY processing means.

21. A remote memory processing system according to claim 20, wherein said MAC processing means accesses said HOST memory means in response to a cache miss.

22. A remote memory processing system according to claim 21, wherein said cache is updated with data read from said HOST memory means.

23. A remote processing system according to claim 20, wherein said system further comprises a cache controller.

24. A remote memory processing system according to claim 19, wherein said connecting means is at least one of a PCI bus and PCI-type bus.

25. A remote memory processing system according to claim 19, wherein said cache memory means includes at least a ROM.

26. A remote memory processing system according to claim 19, wherein said MAC processing means becomes master of said connecting means when accessing said second memory means.

27. A remote memory processing system according to claim 19, wherein said connecting means is capable of reading or writing multiple sequential words in a single transaction.

28. A remote memory processing system according to claim 19, wherein said MAC processing means includes built-in hardware-based context switching.

29. A remote processing system according to claim 28, wherein said context switching includes prioritization.

\* \* \* \* \*